(12) United States Patent
Royston et al.

(10) Patent No.: US 9,026,048 B2
(45) Date of Patent: May 5, 2015

(54) DETECTING A PRESENCE OF NEAR FIELD COMMUNICATIONS (NFC) DEVICES

(75) Inventors: Philip Stewart Royston, Berkshire (GB); Steven Deane Hall, Olivenhain, CA (US); Brima Ibrahim, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 328 days.

(21) Appl. No.: 13/325,675

(22) Filed: Dec. 14, 2011

(65) Prior Publication Data

US 2013/0143488 A1   Jun. 6, 2013

Related U.S. Application Data

(60) Provisional application No. 61/566,855, filed on Dec. 5, 2011.

(51) Int. Cl.
*H04B 5/00*     (2006.01)
*H04B 1/04*     (2006.01)
(Continued)

(52) U.S. Cl.
CPC .......... *H04B 5/0075* (2013.01); *G06K 7/10128* (2013.01); *H04B 5/0043* (2013.01); *G06K 7/10237* (2013.01)

(58) Field of Classification Search
CPC .......... G06K 7/10128; G06K 19/0723; H04B 5/0075
USPC ....................................... 455/41.1
See application file for complete search history.

(56) References Cited

U.S. PATENT DOCUMENTS 6,905,074 B2   6/2005   Charrat
6,972,662 B1  12/2005   Ohkawa et al.
(Continued)

FOREIGN PATENT DOCUMENTS

EP   1 394 720 A2    3/2004
EP   1 840 790 A2   10/2007
(Continued)

OTHER PUBLICATIONS

European Search Report for EP Patent Application No. EP12006692.3, European Patent Office, Munich, Germany, mailed on Mar. 21, 2013.
(Continued)

*Primary Examiner* — Wesley Kim
*Assistant Examiner* — Devan Sandiford
(74) *Attorney, Agent, or Firm* — Sterne, Kessler, Goldstein & Fox P.L.L.C.

(57) ABSTRACT

A near field communications (NFC) device is disclosed that detects a presence of another NFC capable device within its magnetic field. The NFC device observes signal metrics of an observed detection signal at various intervals. The NFC device determines a statistical relationship based upon at least two first signal metrics from among the signal metrics to determine an estimate of at least one second signal metric from among the signal metrics. The NFC device compares a difference between the estimate of the signal metric of the at least one second signal metric and the at least one second signal metric. The NFC capable device makes a first determination that another NFC device is present within its magnetic field when the difference indicates that the at least one second signal metric is non-linearly related to the at least two first signal metrics.

25 Claims, 7 Drawing Sheets

(51) Int. Cl.
*H04B 1/00* (2006.01)
*H01Q 11/12* (2006.01)
*G06K 7/10* (2006.01)

(56) References Cited

U.S. PATENT DOCUMENTS

| | | | |
|---|---|---|---|
| 6,982,645 | B2 | 1/2006 | Ricci |
| 7,245,222 | B2 | 7/2007 | Bierach |
| 7,412,224 | B2 | 8/2008 | Kotola et al. |
| 7,522,878 | B2 | 4/2009 | Baarman |
| 7,598,872 | B2 | 10/2009 | Pluss et al. |
| 7,720,438 | B2 * | 5/2010 | Rowse ................ 455/41.1 |
| 7,782,209 | B2 | 8/2010 | Lowe et al. |
| 7,889,057 | B2 | 2/2011 | Seon |
| 7,986,916 | B2 | 7/2011 | Williams |
| 8,014,721 | B2 | 9/2011 | Johnson |
| 8,063,746 | B2 * | 11/2011 | Borcherding ............ 340/10.34 |
| 8,116,679 | B2 | 2/2012 | Dunko |
| 8,140,010 | B2 | 3/2012 | Symons et al. |
| 8,150,321 | B2 | 4/2012 | Winter et al. |
| 8,203,429 | B2 | 6/2012 | Borcherding |
| 8,271,662 | B1 | 9/2012 | Gossweiler, Iii et al. |
| 8,319,612 | B2 | 11/2012 | Borcherding |
| 8,326,224 | B2 | 12/2012 | Butler |
| 8,358,596 | B2 | 1/2013 | Byrne et al. |
| 8,422,946 | B2 | 4/2013 | Bangs et al. |
| 8,432,293 | B2 | 4/2013 | Symons |
| 8,489,020 | B2 | 7/2013 | Bangs et al. |
| 8,538,332 | B2 | 9/2013 | Huomo et al. |
| 2004/0113755 | A1 * | 6/2004 | Ricci ................ 340/10.3 |
| 2004/0256460 | A1 | 12/2004 | Charrat |
| 2005/0077356 | A1 | 4/2005 | Takayama et al. |
| 2006/0031028 | A1 * | 2/2006 | Corson et al. ............ 702/32 |
| 2006/0170553 | A1 * | 8/2006 | Bierach ................ 340/572.4 |
| 2007/0001816 | A1 * | 1/2007 | Lindley et al. ........... 340/10.34 |
| 2007/0188326 | A1 * | 8/2007 | Pluss et al. ............. 340/572.4 |
| 2007/0229273 | A1 * | 10/2007 | Hoemann et al. ......... 340/572.4 |
| 2007/0236336 | A1 * | 10/2007 | Borcherding ............ 340/10.34 |
| 2008/0180248 | A1 * | 7/2008 | Lian et al. ............. 340/572.1 |
| 2008/0291043 | A1 | 11/2008 | Duron |
| 2010/0015917 | A1 | 1/2010 | Symons et al. |
| 2010/0124252 | A1 | 5/2010 | Shin et al. |
| 2010/0204563 | A1 | 8/2010 | Stodilka et al. |
| 2010/0271188 | A1 | 10/2010 | Nysen |
| 2010/0301855 | A1 | 12/2010 | Hyde et al. |
| 2011/0007936 | A1 | 1/2011 | Rhoads |
| 2012/0329391 | A1 * | 12/2012 | Hall et al. ................ 455/41.1 |
| 2013/0122813 | A1 * | 5/2013 | Finkenzeller et al. ....... 455/41.2 |
| 2013/0225071 | A1 * | 8/2013 | ROYSTON et al. ......... 455/41.1 |

FOREIGN PATENT DOCUMENTS

| | | |
|---|---|---|
| EP | 2 538 571 A1 | 12/2012 |
| WO | WO 2006/076669 A1 | 7/2006 |
| WO | WO 2011138008 A1 * | 11/2011 ............ H04W 84/18 |

OTHER PUBLICATIONS

International Standard: ISO/IEC 21481, *Information technology—Telecommunications and information exchange between systems—Near Field Communication Interface and Protocol-2 (NFCIP-2)*, pp. 1-12, First edition, Reference No. ISO/IEC 21481:2005(E), ISO/IEC (Jan. 2005).

International Standard: ISO/IEC 18092, *Information technology—Telecommunications and information exchange between systems—Near Field Communication—Interface and Protocol (NFCIP-1)*, pp. 1-66, First edition, Reference No. ISO/IEC 18092:2004(E), ISO/IEC (Apr. 2004).

*NFC Activity Specification, Activity 1.0, NFCForum-TS-Activity-1.0*, NFC Forum, Inc., Entire document (117 pages), Nov. 18, 2010.

European Search Report for EP Patent Applicaton No. EP 12004639.6, European Patent Office, Munich, Germany, mailed on Sep. 25, 2012; 3 pages.

European Search Report for EP Patent Application No. EP13000555.6, European Patent Office, Munich, Germany, mailed on Jul. 10, 2013; 3 pages.

English language abstract of KR 10-2010-0016754 A, Thomson Innovation, http://www.thomsoninnovation.com, accessed Nov. 11, 2013; 6 pages.

Communication from the Examining Division of the European Patent Office for EP Patent Application No. EP 12004639.6, mailed Oct. 12, 2012; 5 pages.

Communication from the Examining Division of the European Patent Office for EP Patent Application No. EP 12006692.3, mailed Apr. 3, 2013; 5 pages.

Communication from the Examining Division of the European Patent Office for EP Patent Application No. EP 13000555.6, mailed Jul. 22, 2013; 5 pages.

* cited by examiner

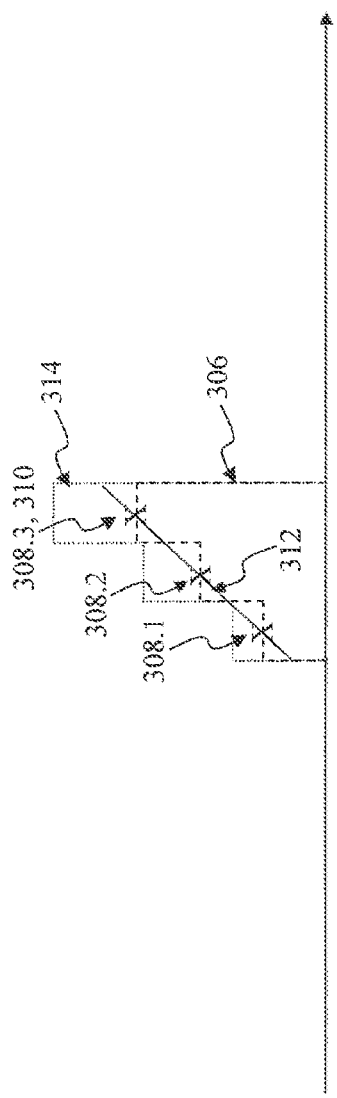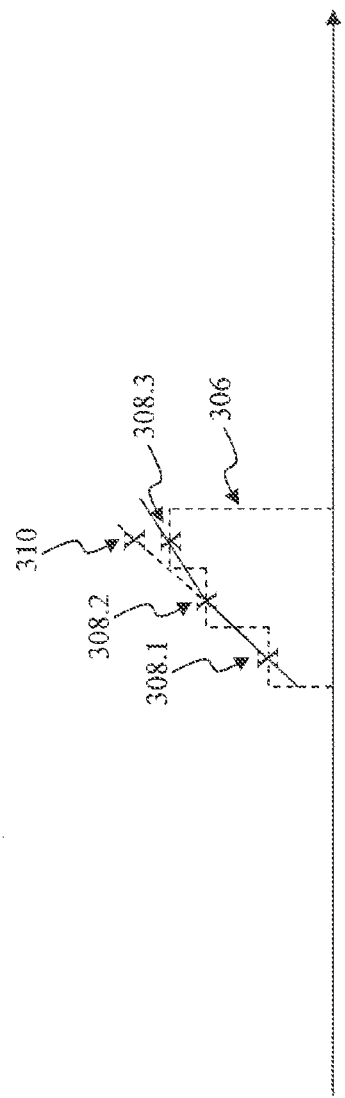

DETECTING A PRESENCE OF NEAR FIELD COMMUNICATIONS (NFC) DEVICES

CROSS-REFERENCE TO RELATED APPLICATIONS

The present application claims the benefit of U.S. Provisional Patent Appl. No. 61/566,855, filed Dec. 5, 2011, which is incorporated herein by reference in its entirety.

BACKGROUND

1. Field of Invention

The invention relates to near field communications (NFC), and more specifically to detecting a presence of a NFC capable device.

2. Related Art

Near field communication (NFC) devices are being integrated into mobile devices, such as smartphones for example, to facilitate the use of these mobile devices in conducting daily transactions. For example, instead of carrying numerous credit cards, the credit information provided by these credit cards can be loaded into a NFC device and stored therein to be used as needed. The NFC device is simply tapped to a credit card terminal to relay the credit information to it to complete a transaction. As another example, a ticket writing system, such as those used in bus and train terminals, may simply write ticket fare information onto the NFC device instead of providing a paper ticket to a passenger. The passenger simply taps the NFC device to a reader to ride the bus or the train without the use of the paper ticket.

Generally, a NFC interaction includes a polling mode of operation to establish a communication among NFC devices. A first conventional approach probes a magnetic field of a first conventional NFC device for a second NFC device in accordance with a predefined polling routine. In this first conventional approach, the first conventional NFC device generates the magnetic field without any information for a predetermined duration, typically referred to as a guard time, that is technology dependent. The first conventional NFC device then probes the magnetic field for a second NFC device of a first technology type, such as type A, type B, or type F to provide some examples, using a conventional polling command upon expiration of the guard time. The conventional polling command includes such a conventional request command, type A (REQA), a conventional request command, type B (REQB), or a conventional request command, type F (REQF). The first conventional NFC device then generates the magnetic field without any information for another guard time and probes the magnetic field for a second NFC device of a second technology type using the conventional polling command if no response is received from the second conventional NFC device. The first conventional approach is further described in "NFC Forum: NFC Activity Specification: Technical Specification, NFC Forum™ Activity 1.0 NFCForum-TS-Activity-1.0," published Nov. 18, 2010, which is incorporated by reference herein in its entirety.

The guard time of the first conventional approach unnecessarily consumes power. Typically, the guard time is approximately 5 ms when probing for type A and type B NFC devices and may reach more than 20 ms when probing for type F NFC devices. Additionally, the first conventional NFC device may have to generate the magnetic field without any information for more than one guard time and probe the magnetic field using more than one polling command for certain technologies. For example, the first conventional approach typically polls for type A devices then for type B devices which is followed by type F devices. In this example, the first conventional NFC device generates the guard time for type A, B, and F devices and provides the REQA, REQB, and REQF commands to establish a communication with a type F NFC device.

A second conventional approach transmits detection pulses having substantially similar magnitudes to detect a presence of NFC devices. A first NFC device continuously provides the detection pulses until a change in the magnitude one of the detection pulses is detected. This change is indicative of a second NFC device being present within a magnetic field of the first NFC device. The second conventional approach is further described in U.S. patent application Ser. No. 12/446,591, filed on Apr. 22, 2009 under 35 U.S.C. §371 (c), which is incorporated herein by reference in its entirety.

However, this simple detection of pulse change is susceptible to changes in environment. For example, moving the first NFC device around the environment may cause the magnitudes of the detection pulses to change. As another example, objects within the environment, such as metal objects or other non-NFC capable devices to provide some examples, entering into the magnetic field may cause the magnitudes of the detection pulses to change. These changes may result from changes in the environment alone and, not from the second NFC becoming present within the magnetic field. Consequentially, the first NFC device may improperly determine that the second NFC device is present.

Thus, there is a need to detect a presence of another NFC device within a magnetic field that overcomes the shortcomings described above. Further aspects and advantages of the present invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

FIG. 3C illustrates a second possible change in the detection signal used by the first NFC capable device to detect the presence of the second NFC capable device within its magnetic field according to an exemplary embodiment of the present invention;

FIG. 3D illustrates a third possible change in the detection signal used by the first NFC capable device to detect the presence of the second NFC capable device within its magnetic field according to an exemplary embodiment of the present invention;

Figure 6A:
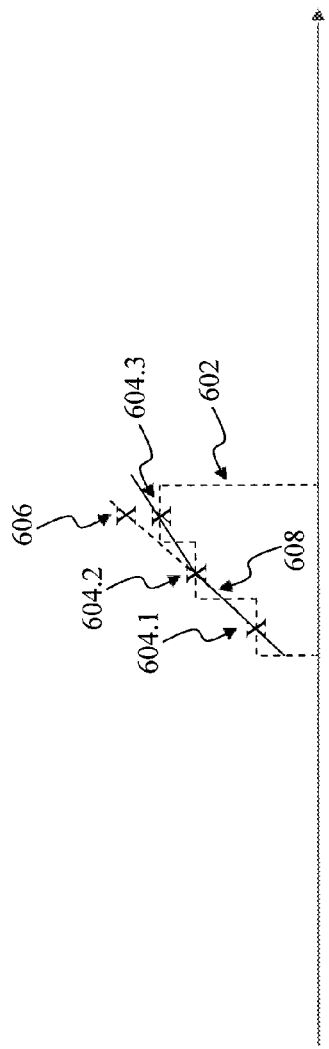
Figure 6B:
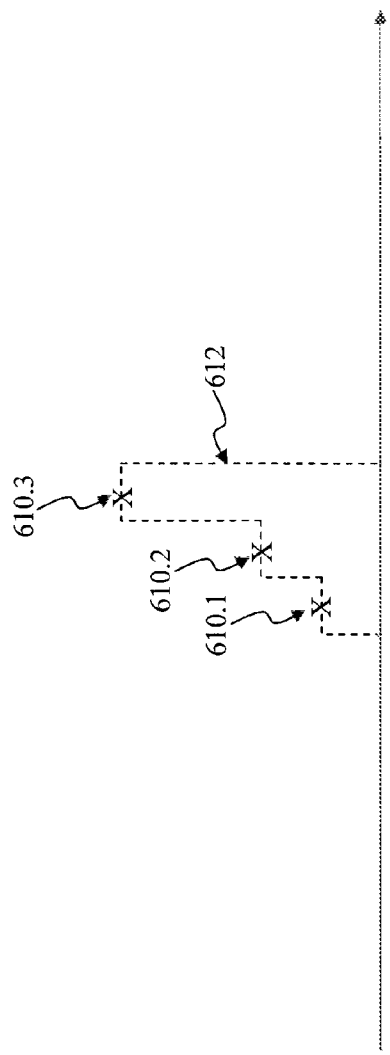

FIG. 6A illustrates a first possible change in the detection signal used by the first NFC capable device to detect that the second NFC capable device remains within its magnetic field according to an exemplary embodiment of the present invention; and FIG. 6B illustrates a second possible change in the detection signal used by the first NFC capable device to detect that the second NFC capable device remains within its magnetic field according to an exemplary embodiment of the present invention.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although, the description of the present invention is to be described in terms of NFC, those skilled in the relevant art(s) will recognize that the present invention may be applicable to other communications that use the near field and/or the far field without departing from the spirit and scope of the present invention. For example, although the present invention is to be described using NFC capable communication devices, those skilled in the relevant art(s) will recognize that functions of these NFC capable communication devices may be applicable to other communications devices that use the near field and/or the far field without departing from the spirit and scope of the present invention.

An Exemplary Near Field Communications (NFC) Environment

Figure 1:
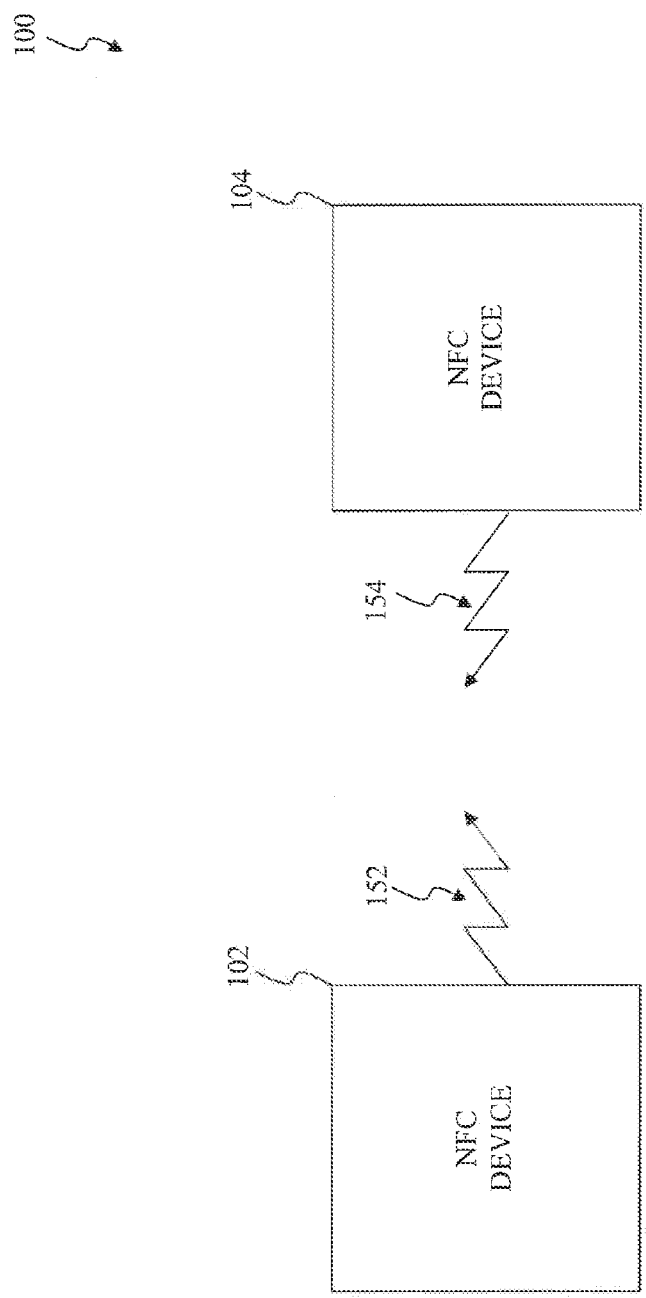
FIG. 1 illustrates a block diagram of a NFC environment according to an exemplary embodiment of the invention.

FIG. 1 illustrates a block diagram of a NFC environment according to an exemplary embodiment of the invention. A NFC environment 100 provides wireless communication of information, such as one or more commands and/or data, among a first NFC device 102 and a second NFC device 104 that are sufficiently proximate to each other. The first NFC device 102 and/or the second NFC device 104 may be implemented as a standalone or a discrete device or may be incorporated within or coupled to another electrical device or host device such as a mobile telephone, a portable computing device, another computing device such as a personal, a laptop, or a desktop computer, a computer peripheral such as a printer, a portable audio and/or video player, a payment system, a ticket writing system such as a parking ticketing system, a bus ticketing system, a train ticketing system or an entrance ticketing system to provide some examples, or in a ticket reading system, a toy, a game, a poster, packaging, advertising material, a product inventory checking system and/or any other suitable electronic device that will be apparent to those skilled in the relevant art(s) without departing from the spirit and scope of the invention.

The first NFC device 102 detects a presence of the second NFC device 104 to enable communication of the information between the first NFC device 102 and the second NFC device 104.

Conventional Detection Mode of Operation

Conventionally, a first conventional NFC device operates in a conventional detection mode of operation to detect the presence of a second conventional NFC device. The first conventional NFC enters into a conventional polling mode of operation to establish communication with the second conventional NFC device upon detection of the second conventional NFC device.

Figure 2:
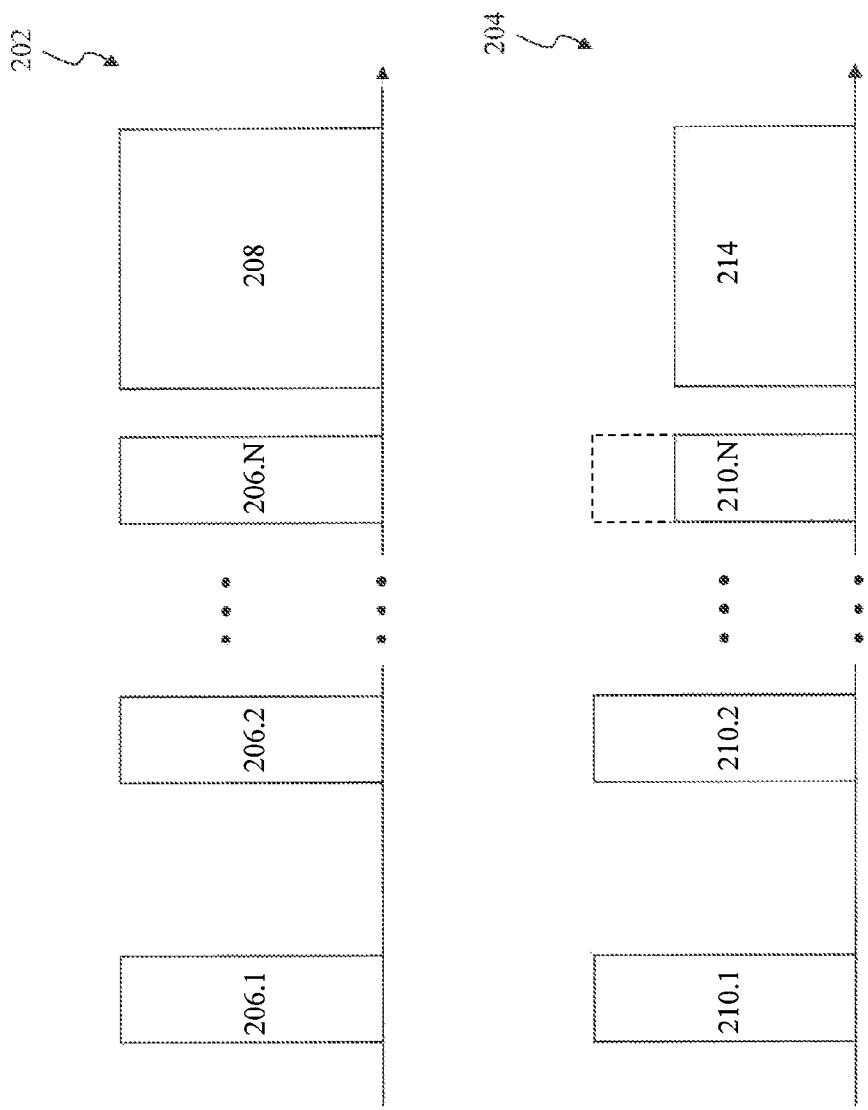
FIG. 2 illustrates a conventional detection mode of operation used by a first conventional NFC device to detect a presence of a second conventional NFC device.

FIG. 2 illustrates a conventional detection mode of operation used by a first conventional NFC device to detect a presence of a second conventional NFC device. A first conventional NFC device provides conventional detection pulses having substantially similar magnitudes until a change in the magnitude one of the conventional detection pulses is detected. This change in the magnitude indicates a second conventional NFC device has entered into a magnetic field provided by the first conventional NFC device.

Upon detection of the second conventional NFC device, the first conventional NFC enters into a conventional polling mode of operation to establish communication with the second conventional NFC device.

As illustrated by a graphical illustration 202, the first conventional NFC device provides conventional detection pulses 206.1 through 206.N, each of the conventional detection pulses 206.1 through 206.N being characterized as having a substantially similar magnitude. For example, a magnitude of the conventional detection pulse 206.1 is substantially similar to a magnitude of the conventional detection pulse 206.2 which is substantially similar to a magnitude of the conventional detection pulse 206.N. As additionally illustrated by the graphical illustration 202, the first conventional NFC device enters into a conventional polling mode of operation 208 following the conventional detection pulse 206.N to establish communication with the second conventional NFC device. One example of the conventional polling mode of operation 208 is described in "NFC Forum: NFC Activity Specification: Technical Specification, NFC Forum™ Activity 1.0 NFCForum-TS-Activity-1.0," published Nov. 18, 2010, which is incorporated by reference herein in its entirety.

As illustrated by a graphical illustration 204, the first conventional NFC device observes the conventional detection pulses 206.1 through 206.N, referred to as conventional observed detection pulses 210.1 through 210.N. The conventional observed detection pulses 210.1 through 210.(N−1) are characterized as having substantially similar magnitudes. The substantially similar magnitudes of the conventional observed detection pulses 210.1 through 210.(N−1) indicate that the second conventional NFC device is not present within the magnetic field. As additionally illustrated by the graphical illustration 204, a magnitude of the observed detection pulse 210.N is not substantially similar to the magnitude of the observed detection pulse 210.(N−1). This difference in magnitudes indicates that the second conventional NFC device has entered into the magnetic field during the conventional detection pulse 206.N. Accordingly, the first conventional NFC device may enter into the conventional polling mode of operation 208 to establish communication with the second conventional NFC device. The conventional detection mode of operation is further described in U.S. patent application Ser. No. 12/446,591, filed on Apr. 22, 2009, which is incorporated herein by reference in its entirety.

However, this simple detection of changes of the conventional detection mode is susceptible to changes in environment. For example, moving the first conventional NFC device around the environment may cause the magnitudes of the conventional detection pulses 206.1 through 206.N to change. As another example, objects within the environment, such as metal objects or other non-NFC capable devices to provide some examples, entering into the magnetic field may cause the magnitudes of the conventional detection pulses 206.1 through 206.N to change. However, these changes result from changes in the environment, not from the second conventional NFC becoming present within the magnetic field. Consequentially, the first conventional NFC device may improperly determine that the second conventional NFC device is present within the magnetic field and enter into the conventional polling mode of operation 208 when the second conventional NFC device is not present within the magnetic field.

Typically, these changes that result from the environment may be characterized as being linear. Whereas, changes that result from another NFC capable device becoming present within the magnetic field may be characterized as being non-linear. For example, the other NFC capable device begins to derive or harvest power upon entering the magnetic field which causes a non-linear change in the magnetic field. However, the conventional detection mode of operation is unable to distinguish between linear changes and non-linear changes; therefore, the conventional detection mode is susceptible to misinterpreting changes in the environment as an indication that the second conventional NFC is present within the magnetic field.

Exemplary Detection Mode of Operation

The present invention is capable of differentiating between linear changes and non-linear changes such that changes in a detection signal of the present invention which are characterized as being linear may be identified as being changes in the environment. Those changes in the detection signal of the present invention which are characterized as being non-linear may be identified as resulting from another NFC capable device becoming present within the magnetic field.

Figure 3A:
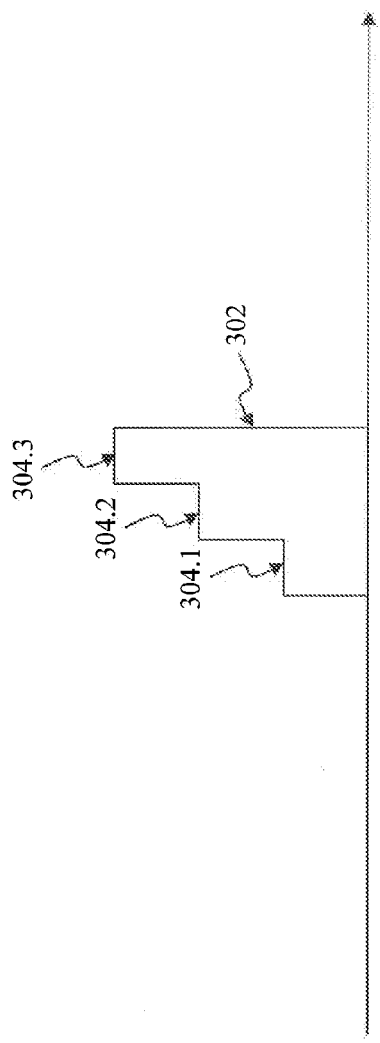
FIG. 3A illustrates a detection signal used by a first NFC capable device to detect a presence of a second NFC capable device within its magnetic field according to an exemplary embodiment of the present invention.

FIG. 3A illustrates a detection signal that is used by a first NFC capable device to detect a presence of a second NFC capable device within its magnetic field according to an exemplary embodiment of the present invention. Typically, a first NFC capable device, such as the first NFC device 102 to provide an example, is configured to operate in an initiator, or a reader, mode of operation and a second NFC capable device, such as the second NFC device 104 to provide an example, is configured to operate in a target, or a tag, mode of operation.

The first NFC capable device provides a magnetic field representing a detection signal 302 to detect for the presence of the second NFC capable device within its magnetic field. The detection signal 302 is characterized as being a monotonically increasing and/or decreasing function such as a monotonically increasing step or staircase function to provide an example. In an exemplary embodiment, the first NFC capable device may provide multiple detection signals 302 to form a detection sequence. In this exemplary embodiment, the multiple detection signals 302 from among the detection sequences are provided at spaced intervals in time. For example, the first NFC capable device may periodically provide each of the detection signals 302 from among the detection sequence. As another example, the first NFC capable device may provide each of the detection signals 302 from among the detection sequence in response to an event. As a further example, the first NFC capable device may provide each of the detection signals 302 from among the detection sequence at different times.

As shown in FIG. 3A, the first NFC capable device provides the detection signal 302 at a first power level $p_1$ for a first duration $t_1$ to provide a first interval 304.1. Typically, the detection signal 302 represents a waveform that is modulated onto a carrier wave; however, for clarity, only the envelope of this modulated carrier wave is shown in FIG. 3A through FIG. 3D. The first NFC capable device then adjusts the power level of the detection signal 302 from the first power level $p_1$ to a second power level $p_2$ and provides the detection signal 302 at the second power level $p_2$ for a second duration $t_2$ to provide a second interval 304.2. The first NFC capable device then adjusts the power level of the detection signal 302 from the second power level $p_2$ to a third power level $p_3$ and provides the detection signal 302 at the third power level $p_3$ for a third duration $t_3$ to provide a third interval 304.3. However, the detection signal 302 as shown in FIG. 3A is for illustrative purposes only, those skilled in the relevant art(s) will recognize that the detection signal 302 may include any suitable number of intervals without departing from the spirit and scope of the present invention.

In an exemplary embodiment, the first power level $p_1$ is less than the second power level $p_2$ which is less than the third power level $p_3$. In another exemplary embodiment, a lowest power level, such as the first power level $p_1$ to provide an example, has a sufficient power level to allow the second NFC capable device to derive power from the detection sequence 300 upon entering the magnetic field. In a further exemplary embodiment, the first duration $t_1$, the second duration $t_2$, and/or the third duration $t_3$ are of sufficient duration to allow the magnetic field produced thereby to stabilize, which may be approximately 20 microseconds to provide an example.

The first NFC capable device detects a change in its magnetic field by observing the detection signal 302 to provide an observed detection signal 306. The first NFC capable device observes a first signal metric 308.1 that corresponds to the first interval 304.1, a second signal metric 308.2 that corresponds to the second interval 304.2, and a third signal metric 308.3 that corresponds to the third interval 304.3 from the observed detection signal 306. The first signal metric 308.1, the second signal metric 308.2, and/or the third signal metric 308.3 may represent a mean, a total energy, an average power, a mean square, an instantaneous power, a root mean square, a variance, a norm, a voltage level, a coupling factor, and/or any other suitable signal metric of their corresponding interval 304.1 through 304.3 that will be apparent by those skilled in the relevant art(s) without departing from the spirit and scope of the present invention.

The first NFC capable device determines a statistical relationship 312 based upon at least two first signal metrics from among the signal metrics 308.1 through 308.3 to determine a signal metric estimate 310 that represents an estimate of at least one second signal metric from among the signal metrics 308.1 through 308.3. For example, the first NFC capable device may statistically determine a line of best fit as the statistical relationship 312 using the first signal metric 308.1 and the second signal metric 308.2. As another example, the first NFC capable device may statistically determine a suitable curve, such as a quadric polynomial, a cubic polynomial, a higher-ordered polynomial, or any combination thereof to provide some examples, of best fit as the statistical relationship 312 using the first signal metric 308.1 and the second signal metric 308.2. The first NFC capable device may use the line of best fit and/or the suitable curve of best fit to determine an estimate of the third signal metric 308.3 as the signal metric estimate 310.

The first NFC, capable device compares the signal, metric estimate 310 and the at least one second signal metric to determine a difference between these signal metrics. In other words, the first NFC capable device compares an actual representation and an estimation of the at least one second signal metric to determine their difference. The first NFC capable device makes a first determination that the second NFC capable device is not present within its magnetic field when the difference indicates that the signal metric estimate 310 is linearly related to the at least two first signal metrics. Alternatively, the first NFC capable device makes a second determination that the second NFC capable device is present within its magnetic field when the difference indicates the signal metric estimate 310 is not linearly, that is non-linearly, related to the at least two first signal metrics. In an exemplary embodiment, the first NFC capable device may compare the difference between the at least one second signal metric and the signal metric estimate 310 to a threshold and make the first determination when the difference is less than the threshold or the second determination when the difference is greater than or equal to the threshold.

Figure 3B:
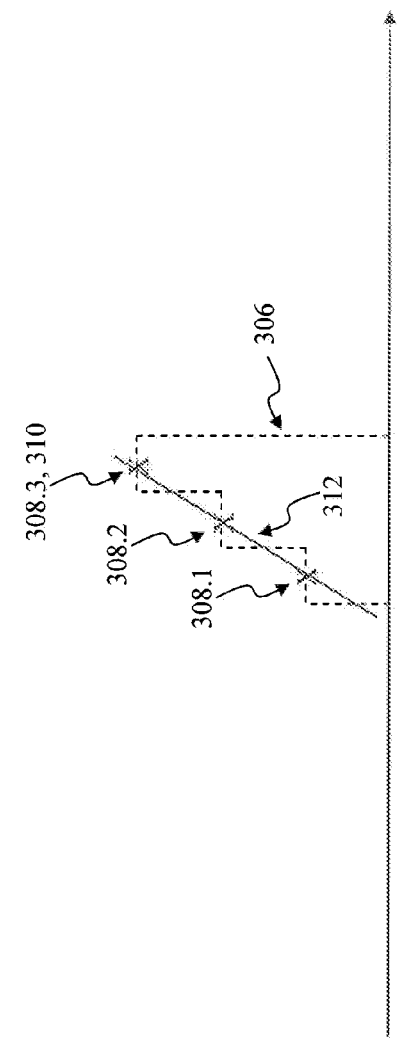
FIG. 3B illustrates a first possible change in the detection signal used by the first NFC capable device to detect the presence of the second NFC capable device within its magnetic field according to an exemplary embodiment of the present invention.

For example, as shown in FIG. 3B, the first NFC capable device observes the first signal metric 308.1, the second signal metric 308.2, and the third signal metric 308.3 from the observed detection signal 306. The first NFC capable device statistically determines a line of best fit as the statistical relationship 312 using the first signal metric 308.1 and the second signal metric 308.2 to determine the signal metric estimate 310 that represents an estimate of the third signal metric 308.3. The first NFC capable device compares the third signal metric 308.3 and the signal metric estimate 310 and makes a determination that the signal metric 308.3 is linearly related to the first signal metric 308.1 and the second signal metric 308.2. The first NFC capable device makes the first determination that the second NFC capable device is not present within its magnetic field since the signal metric estimate 310 is linearly related to the first signal metric 308.1 and the second signal metric 308.2.

Objects within the environment, such as metal objects or other non-NFC capable devices to provide some examples, may enter into the magnetic field of the first NFC capable device. These objects may cause the third signal metric 308.3 to be linearly related to the signal metric estimate 310. However, as shown in FIG. 3C, these objects may cause an expected detection signal 314 of the detection signal 302 to be different from the observed detection signal 306. The first NFC capable device may, optionally, compare the first signal metric 308.1 with an expected signal metric of the first interval 304.1 and/or the second signal metric 308.2 with an expected signal metric of the second interval 304.2 to determine a difference between the observed detection signal 306 and the expected detection signal 314. The expected signal metric of the first interval 304.1 and/or the expected signal metric of the second interval 304.2 represent signal metrics of the first interval 304.1 and the second interval 304.1, respectively, that occur when no other objects are present within the environment.

The first NFC capable device makes a third determination that objects other than the second NFC device are present within its magnetic field when the observed detection signal 306 sufficiently differs from the expected detection signal 314. Alternatively, the first NFC capable device makes a fourth determination no other objects are present within its magnetic field when the observed detection signal 306 is approximately equal the expected detection signal 314. In an exemplary embodiment, the first NFC capable device may compare the difference between the observed detection signal 306 and the expected detection signal 314 to a threshold and make the fourth determination when the difference is less than the threshold or the third determination when the difference is greater than or equal to the threshold.

Typically, the second NFC capable device derives or harvests power from the detection signal 302. The second NFC capable device turns on after sufficient power has been harvested from the detection signal 302. The turning on of the second NFC capable device, as well as harvesting of the power, may cause the non-linear change in the magnetic field of the first NFC capable device. Alternatively, when the second NFC capable device is a powered NFC device which does not harvest power from the magnetic field, the non-linear change or the coupled field may be seen when a shunt regulator in the second NFC capable device limits a voltage on its antenna element.

For example, as shown in FIG. 3D, the first NFC capable device observes the first signal metric 308.1, the second signal metric 308.2, and the third signal metric 308.3 from the observed detection signal 306. The first NFC capable device statistically determines the line of best fit as the statistical relationship 312 using the first signal metric 308.1 and the second signal metric 308.2 to determine the signal metric estimate 310 that represents the estimate of the third signal metric 308.3.

The first NFC capable device compares the third signal metric 308.3 and the signal metric estimate 310 makes a determination that the signal metric 308.3 is non-linearly related to the first signal metric 308.1 and the second signal metric 308.2. The first NFC capable device makes the second determination that the second NFC capable device is present within its magnetic field since the signal metric estimate 310 is non-linearly related to the first signal metric 308.1 and the second signal metric 308.2.

It should be noted that the linear change as shown in FIG. 3C and the non-linear change as shown in FIG. 3D are for illustrative purposes only, those skilled in the relevant art(s) will recognize that other linear and/or non-linear changes are possible without departing from the spirit and scope of the present invention.

Referring again to FIG. 1, upon detecting the presence of the second NFC capable device 104 within its magnetic field, the first NFC capable device 102 may enter into a polling mode, such as the conventional polling mode of operation 208 or any other suitable polling mode that will be apparent to those skilled in the relevant art(s) without departing from the spirit and scope of the present invention, to establish communication with the second NFC capable device.

The first NFC device 102 modulates its corresponding information onto the first carrier wave and generates the first magnetic field by applying the modulated information communication to the first antenna to provide the first information communication 152. The first NFC device 102 continues to apply the first carrier wave without its corresponding information to continue to provide the first information communication 152 once the information has been transferred to the second NFC device 104. The first NFC device 102 is sufficiently proximate to the second NFC device 104 such that the first information communication 152 is inductively coupled onto a second antenna of the second NFC device 104.

The second NFC device 104 derives or harvests power from the first information communication 152 to recover, to process, and/or to provide a response to the information. The second NFC device 104 demodulates the first information communication 152 to recover and/or to process the information. The second NFC device 104 may respond to the information by applying its corresponding information to the first carrier wave that is inductively coupled onto the second antenna to provide the second modulated information communication 154.

Further operations of the first NFC device 102 and/or the second NFC device 104 may be described in International Standard ISO/IE 18092:2004(E), "Information Technology—Telecommunications and Information Exchange Between Systems—Near Field Communication—Interface and Protocol (NFCIP-1)," published on Apr. 1, 2004 and International Standard ISO/IE 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

Although FIG. 1 and FIG. 3A through FIG. 3D has been described in terms of an initiator mode operation and a target mode of operation, those skilled in the relevant art(s) will recognize that the first NFC device 102 and/or the second NFC device 104 as described in FIG. 1 and/or the first NFC capable device and/or the second NFC capable device as described in FIG. 3A through FIG. 3D may alternatively be configured to operate in a communicator mode of operation without departing from the spirit and scope of the present invention. These NFC devices and/or NFC capable devices are configurable to operate in the initiator mode operation and/or the target mode of operation and may switch between these modes of operation in the communicator mode of operation.

Method for Detecting NFC Capable Devices

Figure 4:
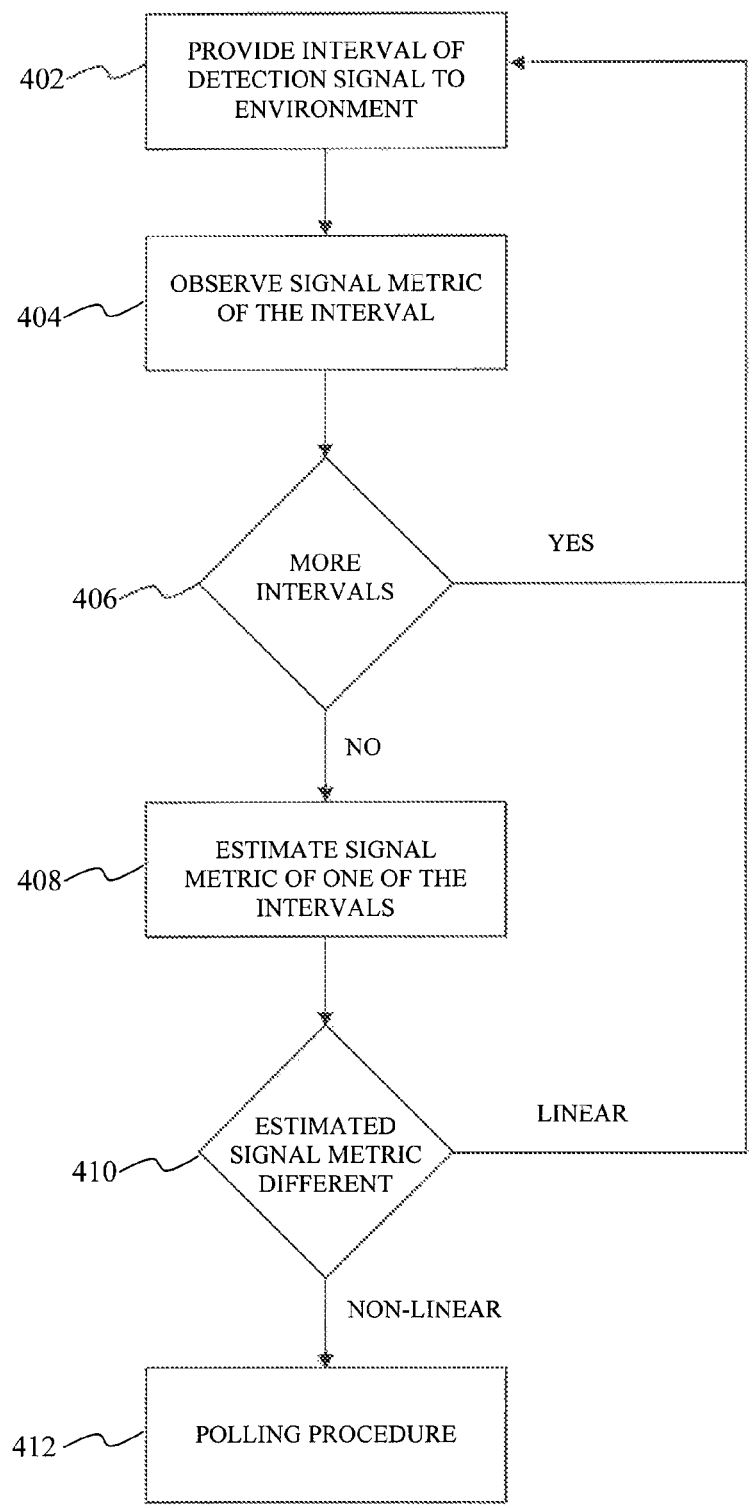
FIG. 4 is a flowchart of exemplary operational steps for detecting the presence of a NFC capable device within a magnetic field according to an exemplary embodiment of the present invention.

FIG. 4 is a flowchart of exemplary operational steps for detecting the presence of a NFC capable device within a magnetic field according to an exemplary embodiment of the present invention. The invention is not limited to this operational description. Rather, it will be apparent to persons skilled in the relevant art(s) from the teachings herein that other operational control flows are within the scope and spirit of the present invention. The following discussion describes the steps in FIG. 4.

At step 402, the operational control flow provides a magnetic field representing an interval of a detection signal, such as one of the detection signal 302. The detection signal may be parsed into multiple intervals, such as the intervals 304.1 through 304.3 to provide an example. Each of the multiple intervals may be characterized as having a corresponding power level p and a corresponding duration t. The operational control flow provides one of these multiple intervals at its corresponding power level p for its corresponding duration t.

At step 404, the operational control flow observes a signal metric of the interval from step 402.

At step 406, the operational control flow determines whether the detection signal includes more intervals. If so, the operational control flow reverts to step 402 to provide another interval of the detection signal at its corresponding power level p for its corresponding duration t. Else, the operational control flow proceeds to step 408.

At step 408, the operational control flow selects one of the intervals from step 402 and estimates a signal metric of this selected interval. For example, the operational control flow may statistically determine a line of best fit using signal metrics of unselected intervals as observed in step 404. In another example, the operational control flow may statistically determine a suitable curve, such as a quadric polynomial, a cubic polynomial, a higher-ordered polynomial, or any combination thereof to provide some examples, of best fit using the signal metrics of the unselected intervals as observed in step 404. The operational control flow may use the line of best fit and or the suitable curve of best fit to estimate the selected interval.

At step 410, the operational control flow compares a difference between the signal metric of the selected interval from step 408 as observed in step 404 and the signal metric of the selected interval from step 408 as estimated in step 408 to a threshold. The operational control flow makes a first determination that the selected interval from step 408 is linearly related to the unselected intervals from step 408 indicating another device is not present within its magnetic field when the difference is less than the threshold. The operational control flow reverts to step 402 to provide another detection signal. Else, the operational control flow makes a second determination that the selected interval from step 408 is non-linearly related to the unselected intervals from step 408 indicating another device is present within its magnetic field when the difference is greater than or equal to the threshold. The operational control flows proceeds to step 412.

At step 412, the operational control flow begins a polling mode of operation to establish a communication with the device that is present within its magnetic field.

An Exemplary NFC Device

Figure 5:
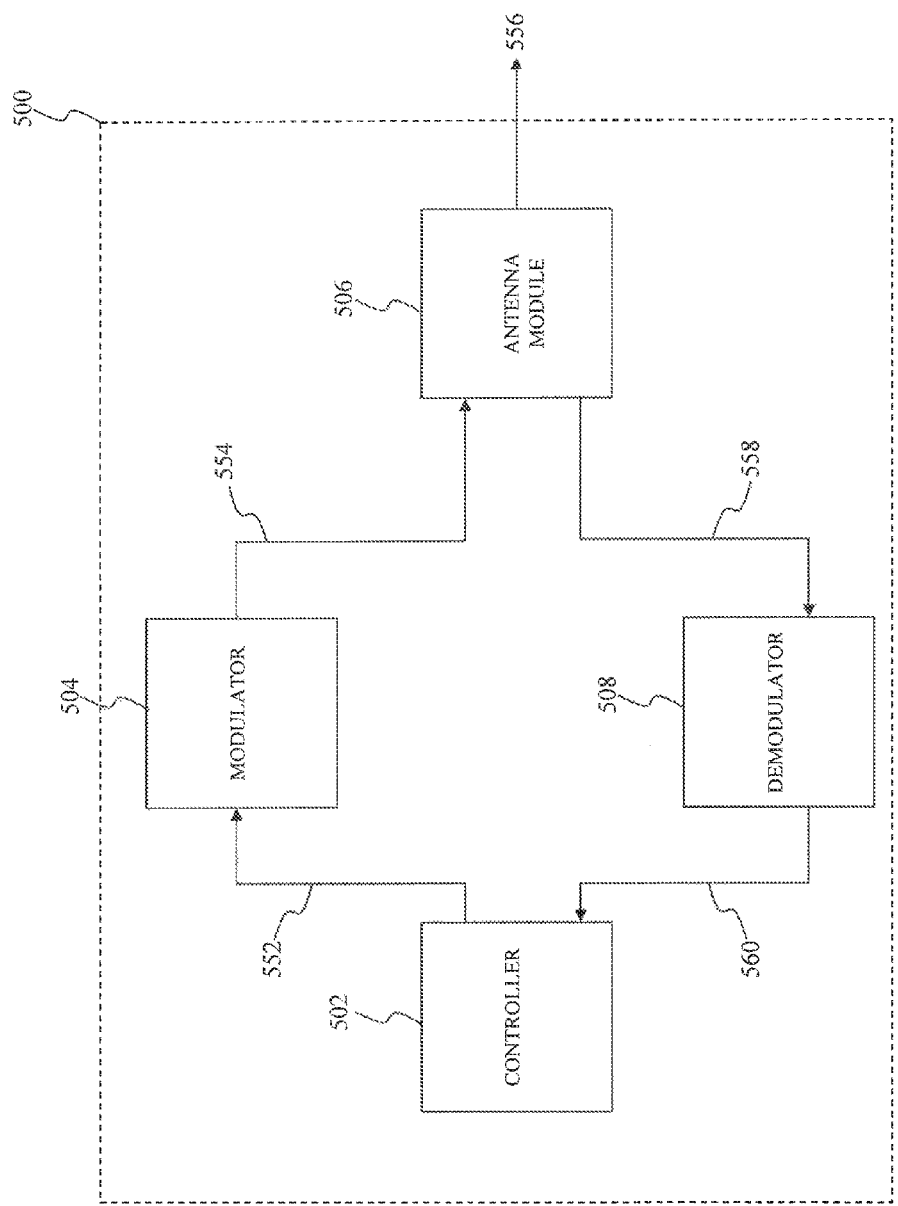
FIG. 5 illustrates a block diagram of a NFC device that may be used to detect a presence of other NFC capable devices according to an exemplary embodiment of the invention.

FIG. 5 illustrates a block diagram of a NFC device that may be used to detect a presence of other NFC capable devices according to an exemplary embodiment of the invention. A NFC device 500 may be configurable to operate in a detection mode of operation to detect a presence of another NFC capable device within in its magnetic field. It should be noted that FIG. 5 illustrates only the detection mode of operation, those skilled in the relevant art(s) will recognize that the NFC device 500 may be configured to operate in other modes of operation, such as a peer (P2P) communication mode or a reader/writer (R/W) communication mode to provide some examples, without departing from the spirit and scope of the present invention. The NFC device 500 includes a controller module 502, a modulator module 504, an antenna module 506, and a demodulator module 508. The NFC device 500 may represent an exemplary embodiment of the first NFC device 102. The controller module 502 controls overall operation and/or configuration of the NFC device 500. The controller module 502 generates a detection signal 552, such as the detection signal 302 to provide an example, in the detection mode of operation. The detection signal 552 may represent a monotonically increasing and/or decreasing function.

The controller module 502 may generate the detection signal 552 in response to a command. The command may be provided to the controller module 502 from one or more data storage devices such as one or more contactless transponders, one or more contactless tags, one or more contactless smartcards, any other machine-readable mediums that will be apparent to those skilled in the relevant art(s) without departing from the spirit and scope of the invention, or any combination thereof. The other machine-readable medium may include, but is not limited to, read only memory (ROM), random access memory (RAM), magnetic disk storage media, optical storage media, flash memory devices, electrical, optical, acoustical or other forms of propagated signals such as carrier waves, infrared signals, digital signals to provide some examples. The controller module 502 may also receive the command from a user interface such as a touch-screen display, an alphanumeric keypad, a microphone, a mouse, a speaker, any other suitable user interface that will be apparent to those skilled in the relevant art(s) without departing from the spirit and scope of the invention to provide some examples. The controller module 502 may farther receive the command from other electrical devices or host devices coupled to the NFC device 500.

The modulator module 504 modulates the detection signal 552 onto a carrier wave, such as a radio frequency carrier wave having a frequency of approximately 13.56 MHz to provide an example, using any suitable analog or digital modulation technique to provide a modulated detection signal 554. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s). In an exemplary embodiment, the modulator module 504 may include a direct digital synthesizer (DDS) under control of the controller module 502 to generate the detection signal 552. In this exemplary embodiment, the modulator module 504 further includes an analog to digital converter (ADC) to convert the detection signal 552 from a digital representation to an analog representation in accordance with the carrier wave to provide the modulated detection signal 554.

The antenna module 506 applies the modulated detection signal 554 to an inductive coupling element, such as a resonant tuned circuit to provide an example, to generate a magnetic field to provide a detection sequence 556. The antenna module 506 observes the detection sequence 556 to provide an observed detection sequence 558.

The demodulator module 508 demodulates the observed detection sequence 558 using any suitable analog or digital modulation technique to provide a recovered detection signal 560. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

The controller module 502 may determine a plurality of signal metrics of the recovered detection signal 560. The plurality signal metrics may include a mean voltage and/or current level, an average voltage and/or current level, an instantaneous voltage and/or current level, a root mean square voltage and/or current level, a mean power, an average power, an instantaneous power, a root mean square power, a signal envelope, and/or any other suitable signal metric of recovered detection signal 560 which will be apparent to those skilled in the relevant art(s) without departing from the spirit and scope of the invention. For example, the controller module 502 may determine the plurality of signal metrics of the recovered detection signal 560 at different instances in time.

The controller module 502 determines a statistical relationship based upon at least two first signal metrics from among the plurality of signal metrics to determine an estimate of at least one second signal metric from among the one of more signal metrics. The controller module 502 compares the estimate of at least one second signal metric and the at least one second signal metric, to determine a difference between these signal metrics. The controller module 502 makes a first determination that another NFC capable device is not present within the magnetic field when the difference indicates that the at least one second signal metric is linearly related to the at least two first signal metrics. Alternatively, the first NFC capable device makes a second determination that another NFC capable device is present within the magnetic field when the difference indicates that the at least one second signal metric is not linearly, that is non-linearly, related to the at least two first signal metrics. In an exemplary embodiment, the controller module 502 may compare the difference between the at least one second signal metric and the estimate of at least one second signal metric to a threshold and make the first determination when the difference is less than the threshold or the second determination when the difference is greater than or equal to the threshold.

Referring again to FIG. 3A, upon detecting the presence of the second NFC capable device within its magnetic field as described in FIG. 3A through FIG. 3D, the first NFC capable device may continue to provide the detection signal 302 to verify that the second NEC capable device remains within its magnetic field. For example, as shown in FIG. 6A, the first NFC capable device detects a change in its magnetic field by observing the detection signal 302 to provide an observed detection signal 602. The first NFC capable device observes a first signal metric 604.1 that corresponds to the first interval 304.1, a second signal metric 604.2 that corresponds to the second interval 304.2, and a third signal metric 604.3 that corresponds to the third interval 304.3 from the observed detection signal 602. The first signal metric 604.1, the second signal metric 604.2, and/or the third signal metric 604.3 may represent a mean, a total energy, an average power, a mean square, an instantaneous power, a root mean square, a variance, a norm, a voltage level, a coupling factor, and/or any other suitable signal metric of their corresponding interval 304.1 through 304.3 that will be apparent by those skilled in the relevant art(s) without departing from the spirit and scope of the present invention.

The first NFC capable device determines a statistical relationship 608 based upon at least two first signal metrics from among the signal metrics 604.1 through 604.3 to determine a signal metric estimate 606 that represents an estimate of at least one second signal metric from among the signal metrics 604.1 through 604.3 in a substantially similar manner as described above in FIG. 3A through FIG. 3D to determine that that the second NFC capable device is present within its magnetic field.

Typically, the second NFC capable device no longer derives or harvests power from the detection signal 302 when it is no longer present within the magnetic field. The first NFC capable device may observe changes, such as an increase and/or decrease to provide some examples, in signal metrics of the observed detection signal 602 when the second NFC capable device has left its magnetic field.

For example, as shown in FIG. 6B, after detecting the presence of the second NFC capable device, the first NFC capable device observes a first signal metric 610.1 that corresponds to the first interval 304.1, a second signal metric 610.2 that corresponds to the second interval 304.2, and a third signal metric 610.3 that corresponds to the third interval 304.3 from another observed detection signal 612 in response to another detection signal 302. The first NFC capable device compares the first signal metric 604.1, the second signal metric 604.2, and/or the third signal metric 604.3 with their corresponding first signal metric 610.1, second signal metric 610.2, and/or third signal metric 610.3 to determine whether a difference between these signal metrics indicates that the second capable NFC device is no longer present within its magnetic field. The first signal metric 610.1, the second signal metric 610.2, and/or the third signal metric 610.3 may represent a mean, a total energy, an average power, a mean square, an instantaneous power, a root mean square, a variance, a norm, a voltage level, a coupling factor, and/or any other suitable signal metric of their corresponding interval 304.1 through 304.3 that will be apparent by those skilled in the relevant art(s) without departing from the spirit and scope of the present invention.

Typically, the first NFC capable device makes a fifth determination that the second NFC device is no longer present within its magnetic field when the first NFC capable device observes at least one difference between corresponding signal metrics. Alternatively, the first NFC capable device makes a sixth determination that the second NFC device remains present within its magnetic field when the first NFC capable device observes no difference between these corresponding signal metrics. In an exemplary embodiment, the first NFC capable device may compare the difference between these corresponding signal metrics to a threshold and make the fifth determination when the difference is greater than or equal to the threshold or the sixth determination when the difference is less than to the threshold.

As additionally shown in FIG. 6B, the third signal metric 610.3 is greater than the third signal metric 604.3 which indicates that the second capable NFC device is no longer present within the magnetic field of the first NFC capable device. The first NFC capable device makes the fifth determination that the second NFC device is no longer present within its magnetic field when the first NFC capable device observes the third signal metric 604.3 being different from the third signal metric 610.3. However, this example is not limiting, other differences between the first signal metric 604.1 and the first signal metric 610.1 and/or the second signal metric 604.2 and the second signal metric 610.2 may also indicate that the second NFC device is no longer present within the magnetic field of the first NFC capable device.

The first NFC capable device may, optionally, enter into a polling mode of operation to verify that the second NFC device is no longer present within its magnetic field.

It should be noted that the linear change as shown in FIG. 6A and the non-linear change as shown in FIG. 6B are for illustrative purposes only, those skilled in the relevant art(s) will recognize that other linear and/or non-linear changes are possible without departing from the spirit and scope of the present invention.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A first near field communication (NFC) device, comprising:
   a modulator configured to modulate a detection signal onto a carrier wave to provide a modulated detection sequence, the detection signal having a first power level for a first duration to provide a first interval, a second power level for a second duration to provide a second interval, and a third power level for a third duration to provide a third interval, the second power level being greater than the first power level;

a demodulator configured to demodulate the modulated detection sequence to provide a recovered detection sequence; and a controller configured to:

determine a first signal metric of the recovered detection sequence corresponding to the first interval and a second signal metric of the recovered detection sequence corresponding to the second interval, estimate a signal metric estimate of the recovered detection sequence based upon a relationship between the first and the second signal metrics, determine a third signal metric of the recovered detection sequence corresponding to the third interval, and determine, based upon a difference between the third signal metric and the signal metric estimate, whether the third signal metric is non-linearly related to the first and the second signal metrics indicating that a second NFC device is present within a magnetic field of the first NFC device.

2. The first NFC device of claim 1, wherein the first, the second, and the third signal metrics each represent at least one selected from a group consisting of an indication of a mean voltage or current of the recovered detection sequence;

an indication of a total energy of the recovered detection sequence;

an indication of an average power of the recovered detection sequence;

an indication of a mean square voltage or current of the recovered detection sequence;

an indication of an instantaneous power of the recovered detection sequence;

an indication of a root mean square power of the recovered detection sequence;

an indication of a voltage or current variance of the recovered detection sequence;

an indication of a norm voltage or current of the recovered detection sequence;

an indication of a coupling factor between the first NFC device and the second NFC device; and an indication of a voltage level of the recovered detection sequence.

3. The first NFC device of claim 1, wherein the detection signal comprises:

a plurality of detection signals being arranged to form a monotonically increasing step function.

4. The first NFC device of claim 1, wherein the detection signal comprises:

a first detection signal being at the first power level for the first duration to provide the first interval;

a second detection signal being at the second power level for the second duration to provide the second interval; and a third detection signal being at the third power level for the third duration to provide the third interval.

5. The first NFC device of claim 1, wherein the second power level is less than the third power level.

6. The first NFC device of claim 1, wherein the relationship between the first and the second signal metrics comprises:

a statistical relationship.

7. The first NFC device of claim 6, wherein the statistical relationship comprises:

a line of best fit between the first and the second signal metrics.

8. The first NFC device of claim 1, wherein the controller is further configured to compare the signal metric estimate and the third signal metric to determine the difference.

9. The first NFC device of claim 1, wherein the controller is further configured to determine the third signal metric is non-linearly related to the first and the second signal metrics in response to the difference being greater than or equal to a threshold.

10. The first NFC device of claim 1, wherein the controller is further configured to determine the third signal metric is linearly related to the first and the second signal metrics in response to the difference being less than a threshold.

11. The first NFC device of claim 1, wherein the controller is further configured to determine, based upon the difference, whether the third signal metric is linearly related to the first and the second signal metrics indicating that the second NFC device is not present within the magnetic field of the first NFC device.

12. The first NFC device of claim 1, wherein the first signal metric is less than the second signal metric, and wherein the second signal metric is less than the third signal metric.

13. A method for detecting a presence of a first near field communication (NFC) device, comprising:

modulating, by a second NFC device, a detection signal onto a carrier wave to provide a modulated detection sequence, the detection signal having a first power level for a first duration to provide a first interval, a second power level for a second duration to provide a second interval, and a third power level for a third duration to provide a third interval, the second power level being greater than the first power level;

applying, by the second NFC device, the modulated detection sequence to an inductive coupling element to generate a magnetic field;

demodulating, by the second NFC device, the modulated detection sequence to provide a recovered detection sequence;

determining, by the second NFC device, a first signal metric of the recovered detection sequence corresponding to the first interval and a second signal metric of the recovered detection sequence corresponding to the second interval;

estimating, by the second NFC device, a signal metric estimate of the recovered detection sequence based upon a relationship between the first and the second signal metrics;

determining, by the second NFC device, a third signal metric of the recovered detection sequence corresponding to the third interval; and determining, by the second NFC device based upon a difference between the third signal metric and the signal metric estimate, whether the third signal metric is non-linearly related to the first and the second signal metrics indicating that the first NFC device is present within the magnetic field.

14. The method of claim 13, wherein the modulating comprises:

modulating a first detection signal at the first power level for the first duration to provide the first interval;

modulating a second detection signal at the second power level for the second duration to provide the second interval; and modulating a third detection signal at the third power level for the third duration to provide the third interval.

15. The method of claim 13, wherein the estimating comprises:

estimating the signal metric estimate based upon a statistical relationship between the first and the second signal metrics.

16. The method of claim 15, wherein the estimating further comprises:
estimating the signal metric estimate based upon line of best fit between the first and the second signal metrics.

17. The method of claim 13, wherein the determining whether the third signal metric is non-linearly related comprises:
determining the difference.

18. The method of claim 13, wherein the determining whether the third signal metric is non-linearly related comprises:
determining the third signal metric is non-linearly related to the first and the second signal metrics in response to the difference being greater than or equal to a threshold.

19. The method of claim 13, wherein the determining whether the third signal metric is non-linearly related comprises:
determining the third signal metric is linearly related to the first and the second signal metrics in response to the difference being less than a threshold.

20. The method of claim 13, wherein the determining the first signal metric and the second signal metric comprises:
determining, for each of the first and the second metrics, at least one selected from a group consisting of:
an indication of a mean voltage or current of the recovered detection sequence;
an indication of a total energy of the recovered detection sequence;
an indication of an average power of the recovered detection sequence;
an indication of a mean square voltage or current of the recovered detection sequence;
an indication of an instantaneous power of the recovered detection sequence;
an indication of a root mean square power of the recovered detection sequence;
an indication of a voltage or current variance of the recovered detection sequence;
an indication of a norm voltage or current of the recovered detection sequence;
an indication of a coupling factor between the first NFC device and the second NFC device; and
an indication of a voltage level of the recovered detection sequence.

21. The method of claim 13, wherein the modulating comprises:
modulating a monotonically increasing step function onto the carrier wave.

22. The method of claim 13, further comprising:
determining, by the second NFC device based upon the difference, whether the third signal metric is linearly related to the first and the second signal metrics indicating that the second NFC device is not present within the magnetic field.

23. The method of claim 13, wherein the first signal metric is less than the second signal metric, and
wherein the second signal metric is less than the third signal metric.

24. The first NFC device of claim 1, further comprising:
an antenna module configured to apply the modulated detection signal to an inductive coupling element to generate the magnetic a field.

25. The method of claim 13, wherein the third power level is greater than the second power level.

* * * * *

UNITED STATES PATENT AND TRADEMARK OFFICE
CERTIFICATE OF CORRECTION

| | | |
|---|---|---|
| PATENT NO. | : 9,026,048 B2 | Page 1 of 1 |
| APPLICATION NO. | : 13/325675 | |
| DATED | : May 5, 2015 | |
| INVENTOR(S) | : Royston et al. | |

It is certified that error appears in the above-identified patent and that said Letters Patent is hereby corrected as shown below:

In the Claims

Column 15, line 23, please replace "consisting of an indication" with --consisting of: an indication--.

Column 18, line 30, please replace "the magnetic a field" with --a magnetic field--.

Signed and Sealed this
Fifth Day of April, 2016

Michelle K. Lee
*Director of the United States Patent and Trademark Office*